(12) United States Patent
Moscaritolo et al.

(10) Patent No.: US 8,560,843 B1
(45) Date of Patent: Oct. 15, 2013

(54) ENCRYPTED UNIVERSAL RESOURCE IDENTIFIER (URI) BASED MESSAGING

(75) Inventors: Vincent E. Moscaritolo, Ashland, OR (US); Damon Cokenias, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 446 days.

(21) Appl. No.: 12/890,425

(22) Filed: Sep. 24, 2010

(51) Int. Cl.
*H04L 29/06* (2006.01)
(52) U.S. Cl.
USPC ............................................ 713/162; 726/27
(58) Field of Classification Search
USPC ................ 713/190–193, 162; 726/14, 15, 27; 380/255
See application file for complete search history.

(56) References Cited

U.S. PATENT DOCUMENTS

| | | | | |
|---|---|---|---|---|
| 7,698,269 | B2 * | 4/2010 | Zhou et al. | 707/999.006 |
| 2003/0037070 | A1 * | 2/2003 | Marston | 707/200 |
| 2006/0106802 | A1 * | 5/2006 | Giblin et al. | 707/9 |
| 2008/0162530 | A1 * | 7/2008 | van Eikeren et al. | 707/102 |

OTHER PUBLICATIONS

"MetaFilter community weblog", http://www.metafilter.com/8916/, Sep. 24, 2010, 7 pages.
Callas, J., et al., "OpenPGP Message Format", *The Internet Society*, Nov. 1998, http://www.ietf.org/rfc/rfc2440.txt, 61 pages.
Callas, J., et al., "OpenPGP Message Format", *The Internet Society*, Nov. 2007, 91 pages.

* cited by examiner

*Primary Examiner* — Tonia L Dollinger
*Assistant Examiner* — Davoud Zand
(74) *Attorney, Agent, or Firm* — Lowenstein Sandler LLP

(57) ABSTRACT

A method and apparatus for encrypted universal resource identifier (URI) based messaging is described. In one embodiment of the method, a computing system receives an encrypted message from a first client computing system over a network, stores the received message in a message data store, generates a shortened uniform resource locator (URL) for subsequent retrieval of the stored message, and sends the shortened URL to the first client computing system. Subsequently, the computing system receives a request, including the shortened URL, from a second client computing system to retrieve the stored message. The computing system encrypts the stored message in a URI and sends the URI to the second client computing system.

17 Claims, 8 Drawing Sheets

ENCRYPTED UNIVERSAL RESOURCE IDENTIFIER (URI) BASED MESSAGING

FIELD OF INVENTION

Embodiments of the invention relate to the field of processing data, and more particularly, to encrypted universal resource identifier (URI) based messaging.

BACKGROUND OF THE INVENTION

To protect information, users often encrypt data using encryption software. Mobile devices, such as smart phones, make extensive use of text messaging services, social networking services, and blogging services, such as Short Message Services (SMS), Twitter, or social networking sites such as Facebook. These services have stringent limitation on the character length of messages. Imagine a mobile user, who can receive and process Twitter or SMS messages; however, these messages have a 140-character limit. A mobile user cannot send a message encrypted with public key cryptography, since even a minimal usable "ASCII-armored" message is at least three times this size. PGP documentation (see The OpenPGP Working Group of the Internet Engineering Task Force (IETF) Proposed Standard RFC 2440) uses the term "ASCII armor" for binary-to-text encoding when referring to Radix-64 message strings. As such, it is not possible to use these services to communicate encrypted content, such as ASCII-armored encrypted content, encoded to commonly used, public key encryption standards, such as OpenPGP (RFC-4880). Further, some application environments (e.g., iPhone) do not allow traditional methods of intercepting email messages for decoding where the email messages are encrypted using public key encryptions, as is used by decoding desktop applications. There are some applications that send and receive encrypted messages, but these programs use symmetric key cryptography, such as AE256, as is used by decoding desktop applications. Unlike in symmetric key cryptography, the sender and recipient do not need to share a secret password in public key cryptography. As such, these application environments do not allow applications to send and receive messages encrypted using public key encryption.

SUMMARY OF THE INVENTION

A method and apparatus for encrypted universal resource identifier (URI) based messaging is described. In an exemplary method of one embodiment, a computing system receives an encrypted message from a first client computing system over a network. The computing system stores the received message in a message data store, and generates a shortened uniform resource locator (URL) for subsequent retrieval of the stored message. The computing system sends the shortened URL to the first client computing system. A user of the computing system can communicate the shortened URL to another user on a second client computing system. In some embodiments, the computing system communicates the shortened URL to the second client computing system via a public medium (e.g., public storage medium or public transmission medium) coupled to the network. The computing system receives a request, including the shortened URL, from the second client computing system to retrieve the stored message. The computing system encrypts the stored message in a URI and sends the URI to the second client computing system.

In some embodiments, the computing system decrypts the encrypted message received from the server computing system, and hashes the decrypted message before storing the message in the message data store. The computing system also generates a unique key for subsequent retrieval of the stored message. In some embodiment, the shortened URL includes a least a portion of the unique key. In some embodiments, the message data store is a message database, and the unique key identifies an entry in the message database storing the message.

In some embodiments, the computing system receives Hypertext Transfer Protocol (HTTP) GET requests for the request, and the computing system extracts the unique key from the shortened URL, and retrieves the stored message using the unique key. In some embodiments, when the computing system encrypts the message in the URI, the computing system encrypts the stored message into a string suitable for URL handling, and prepends an encryption type URI to the string. In some embodiments, the encrypted message is a binary-to-text encoding (e.g., an encoding in a sequence of ASCII printable characters). In other embodiments, the computing system sends the URI as part of an HTTP redirection string, in response to the HTTP GET request, to the second client computing system. In some embodiments, the second client computing system can receive the HTTP redirection string from the computing system, invoke a URL handler for the encryption type URI, and pass the contents of the HTTP redirection string to a messaging application (e.g., text messaging application, instant messaging (IM) messaging application, electronic mail (email) application, viewer application, browser application, or the like) for presenting the original message.

In addition, a computer readable storage medium for encrypted URI based messaging is described. An exemplary computer readable storage medium provides instructions, which when executed on a processing system causes the processing system to perform a method such as the exemplary methods discussed above.

Further, a system for encrypted URI based messaging is described. An exemplary system may include a message data store that stores messages, and a server computing system is coupled to the message data store. The server computing system operates a message server to receive an encrypted message from a first client computing system over a network, store the received message in the message data store, generate a shortened URL for subsequent retrieval of the stored message, and send the shortened URL to the first client computing system. The server computing system can also receive a request, including the shortened URL, from a second client computing system to retrieve the stored message, encrypt the stored message in a URI, and send the URI to the second client computing system.

In some embodiments of the exemplary system, the server computing system includes a network interface to receive network traffic, including at least one of the encrypted message and the request to retrieve the stored message. The server computing system also includes a storage interface coupled to communicate with the message data store, and a message handler, the message handler to monitor the network traffic received on the network interface. The message handler is to transfer the encrypted message to a cryptographic unit for message storage processing on the encrypted message and to transfer the request to the cryptographic unit for message retrieval processing on the request. In some embodiments, the cryptographic unit includes a decryption module to decrypt the encrypted message, a hashing unit to hash the decrypted message for storage in the message data store, a key generator to generate a unique key for subsequent retrieval of the stored message, a key extractor to extract the unique key from the shortened URL of the request, a message retrieval unit to retrieve the stored message using the unique key, an encryption module to encrypt the stored message into a string suitable for URL handling, and a URI generator to generate the URI with an encryption type URI and the encrypted string.

In some embodiments, the first client computing system includes a messaging application to receive input to create the message, an encryption module to encrypt the message, and a network interface to send the encrypted message to the message server over the network and to receive the shortened URL from the message server over the network.

In some embodiments, the second client computing system includes a network interface to send the request to the message server over the network and to receive the URI from the message server, a URL handler, the URL handler to pass the URI to a decryption module to decrypt the encrypted contents of the URI and send the decrypted contents to a messaging application, which processes the decrypted message.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for encrypted universal resource identifier (URI) based messaging is described. In one embodiment of the method, a server computing system receives an encrypted message from a first client computing system over a network, stores the received message in a message data store, generates a shortened uniform resource locator (URL) for subsequent retrieval of the stored message, and sends the shortened URL to the first client computing system. Subsequently, the computing system receives a request, including the shortened URL, from a second client computing system to retrieve the stored message. The computing system encrypts the stored message in a URI and sends the URI to the second client computing system.

As described above, mobile devices, such as smart phones, make extensive use of text messaging services, social networking services, and blogging services, such as Short Message Services (SMS), Twitter, or social networking sites such as Facebook. Since these services have stringent limitation on the character length of messages (e.g., 140-character limit), previously it was not possible for mobile devices to use these services to communicate ASCII-armored encrypted content encoded to commonly used, public key encryption standards, such as OpenPGP (RF-4880). The embodiments described herein allow ASCII-armored encrypted content, which have been encoded to commonly used, public key encryption standards, to be hosted and retrieved by mobile computing systems. For example, a mobile client may post an encrypted message on a message server that returns a shortened URL, which can subsequently be used to retrieve the encrypted message, for example, by accessing the link (e.g., http://tinyurl.com/y8ho9v4) to download the stored message in a URI, including the encrypted message. A web browser plug-in, for example, could be used to decode the wrapping of the returned URI, and to send the decrypted message to a messaging application for presenting the message to a user. The embodiments described herein also provide a work around to application environments that do not allow traditional methods of intercepting email messages for decoding as done by decoding desktop applications. The embodiments register a message handler (e.g., URL handler) that can detect URIs with a specified encryption type URI and send them to a cryptographic unit to decrypt the URI's contents (the encrypted content) retrieved from the message data store, and to send to the messaging application for presenting to a user. The embodiments described herein may provide an alternative way of communicating encrypted messages in these application environments.

In the following description, numerous details are set forth. It will be apparent, however, to one of ordinary skill in the art having the benefit of this disclosure, that embodiments of the present invention may be practiced without these specific details.

Figure 1:
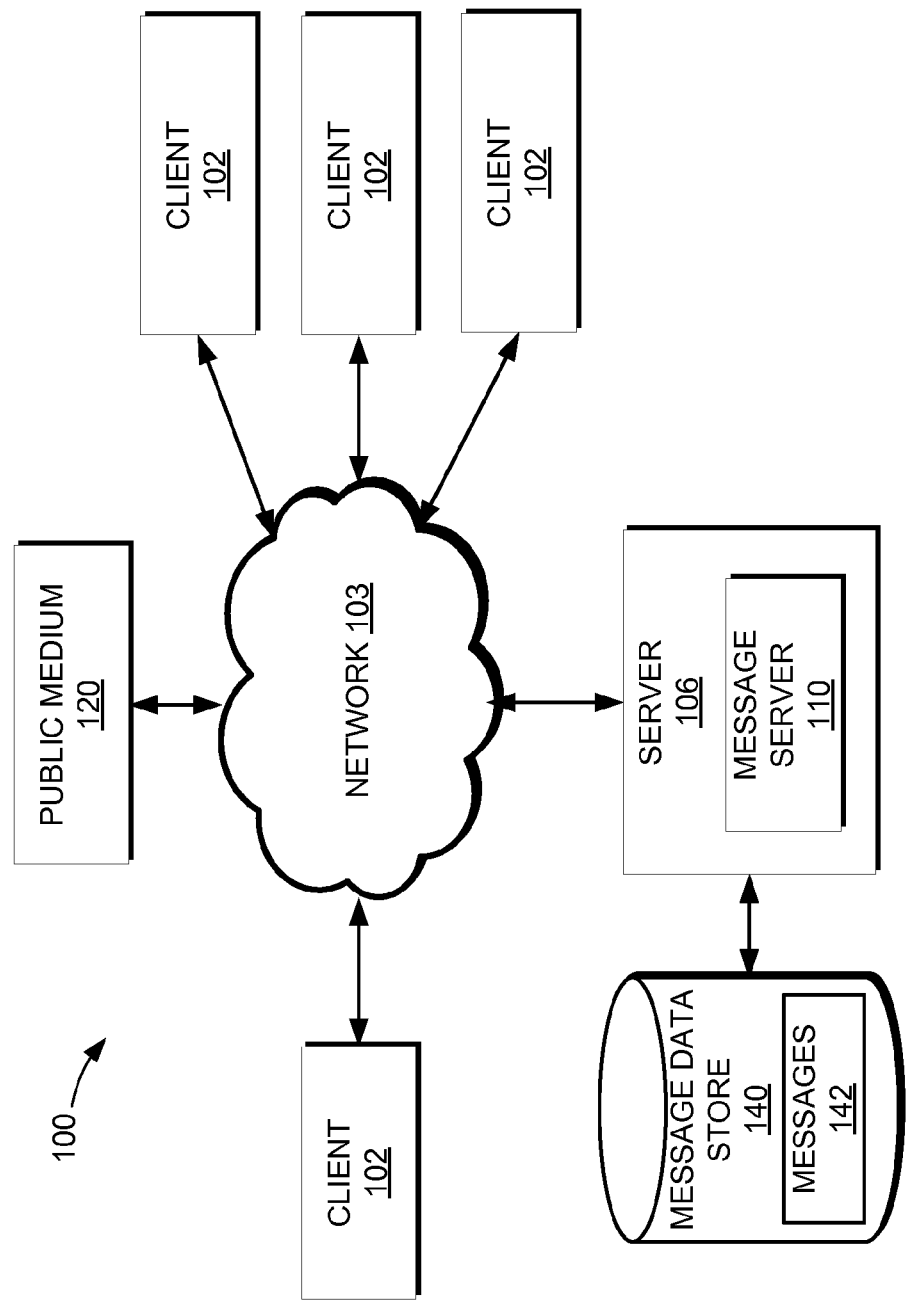
FIG. 1 is a block diagram of exemplary network architecture in which embodiments of the invention may operate.

FIG. 1 is a block diagram of an exemplary network architecture 100 in which embodiments of the invention may operate. The network architecture 100 may include multiple client computing systems 102 and a server computing system 106 coupled via a network 103 (e.g., public network such as the Internet or private network such as a local area network (LAN)). The server computing system 106 hosts a message server 110. The client computing system 102 may include personal computers, laptops, PDAs, mobile phones, network appliances, etc. The server computing system 106 may be a network appliance, a gateway, a personal computer, etc.). In addition, more than one message server 110 may be employed in the network architecture 100 on one or more server computing systems. The client computing systems 102 and the server computing system 106 may reside on the same LAN, or on different LANs that may be coupled together via the Internet, but separated by firewalls, routers, and/or other network devices. In yet another configuration, the message server 110 may reside on a single server, or on different servers, coupled to other devices via a public network (e.g., the Internet) or a private network (e.g., LAN). It should be noted that various other network configurations can be used including, for example, hosted configurations, distributed configurations, centralized configurations, etc.

The network architecture 100 further includes one or more data stores 140 coupled to server computing system 106, or alternatively, to the network 103. The data stores 140 may be local to the server computing system 106, or may be remote to the server computing system 106, such as a remote message data store that can be accessed over the network 103. The data stores 140 may represent a single or multiple data structures (databases, repositories, files, etc.) residing on one or more mass storage devices, such as magnetic or optical storage based disks, tapes or hard drives. The data stores 140 may store any kind of messages including emails, instant messages, text messages, etc. In particular, the data stores 140 store the messages 142 for the URI based message described herein. The data stores 140 can be centralized data repositories that may contain sensitive information and therefore may be encrypted using techniques that would be appreciated by one of ordinary skill in the art having the benefit of this disclosure. The data stores 140 may be, for example, part of a network-attached storage (NAS) system or a storage area network (SAN) system.

In one embodiment, the server computing system 106 receives encrypted messages from client computing systems 102 over the network 130, stores the messages in the message data store 140, generates shortened URLs for subsequent retrieval, and sends the shortened URLs back to the sending client computing systems 102. In another embodiment, the server computing system 106 receives requests from recipient client computing systems 102 to retrieve the stored message. The requests include the corresponding shortened URLs. Upon retrieving the stored messages 142 from the message data store, the server computing system 106 encrypts the stored message in a URI and sends the URI to the recipient client computing systems 102. Embodiments of the server computing system 106 are described below in connection with FIG. 2B.

In some embodiments, the network architecture may include a public medium 120, which is coupled to the network 120. In some embodiments, the public medium is a public storage medium that is capable of storing messages or other information, such as web-hosted messaging services (e.g., Gmail, Yahoo Mail, etc), social networking services (e.g., Facebook, LinkedIn, MySpace, etc), or blogging or micro-blogging services (e.g., Twitter). In another embodiment, the public medium 120 is a public transmission medium that is capable of communicating messages or other information, such as SMS, instant messaging (IM) services, Twitter, non-web-hosted messaging services, or the like. In the depicted embodiment, the public medium 120 is coupled to the network 103, however, in other embodiments, the public medium may include verbal or written communications between users of the client computing systems 102.

In one embodiment, the client computing systems 102 are sending clients and/or recipient clients as described below in connection with FIG. 2A.

Figure 2A:
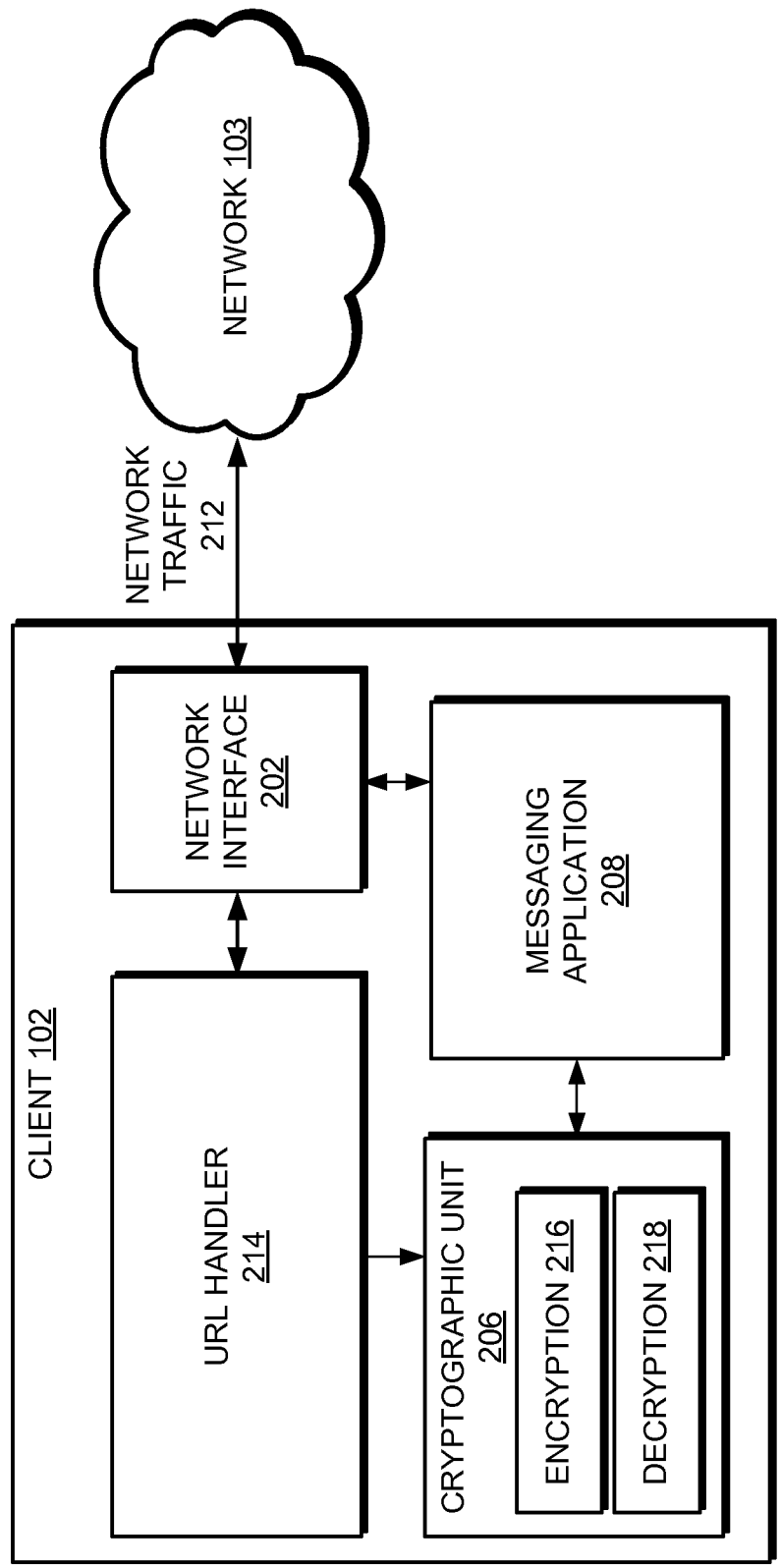
FIG. 2A is a block diagram of one embodiment of a client computing system including a cryptographic unit for encrypted URI based messaging.

FIG. 2A is a block diagram of one embodiment of a client computing system 102 including a cryptographic unit 206 for encrypted URI based messaging. The client computing system 102 may represent a sending client or a recipient client. In some embodiments, both the sending and receiving clients include the components described below. In another embodiment, the sending and receiving clients may include disparate components. In the depicted embodiment, the client computing system 102, when operating as a sending client, includes a messaging application (e.g., email application) 208 to receive input, such as from a user of the client computing system 102, to create a message (e.g., email). When sending the message, the messaging application 208 sends the email to an encryption module 216 of a cryptographic unit 206. The encryption module 216 encrypts the message and sends it back to the messaging application 208, which sends it to a network interface 202 to send the encrypted message to the message server 110 over the network 103. The network interface 202 also is configured to receive a shortened URL, generated by the message server 110, over the network 103 in response to sending the encrypted message to the message server 110.

In the depicted embodiment, the client computing system 102, when operating as a recipient client (which could be the same device or a different device as the sending client), includes the network interface 202 to send a request, including the shortened URL, to the message server 110 over the network 103. The network interface 202 also receives a URI, which includes the encrypted message, from the message server 110. The client computing system 102 also includes a URL handler 214, which may be registered with an operating system of the client computing system 102, to process URLs encoded to the specified encryption type (e.g., "pgp://") that are received over the network interface 202. For example, the operating system may use a table that maps protocol handlers to applications to handle the specified protocol, and the URL handler 214 can be listed on the table to be when URLs encoded to the specified encryption type are received over the network interface 202. In one embodiment, the cryptographic unit 206 is implemented within the URL handler 214. In another embodiment, these components are implemented as separate functions, and the URL handler 214 uses the cryptographic unit 206 to decrypt the encrypted message before sending the decrypted message to the messaging application 208. Alternatively, other configurations may be used as would be appreciated by one of ordinary skill in the art having the benefit of this disclosure. The URL handler 214 allows the embodiments to be implemented in the client computing system without requiring modifications to the operating system of the client computing system 102 and/or the messaging application 208. In one embodiment, the URL handler 214 monitors network traffic 212 received on the network interface 202 and detects the encryption type URI in the URI received on the network interface 202. The URL handler 214 passes the URI to a decryption module 218 of the cryptographic unit 206. The decryption module 218 decrypts the URI's contents and sends the decrypted contents to the messaging application 208. The messaging application 208 receives the decrypted contents for presenting the original message.

In one embodiment, the cryptographic unit 206 is a browser plug-in. In another embodiment, the cryptographic unit 206 is a standalone application or script. In another embodiment, the cryptographic unit 206 is integrated into the messaging application 208. Alternatively, other configurations of the client computing system 102 may be used as would be appreciated by one of ordinary skill in the art having the benefit of this disclosure.

Figure 2B:
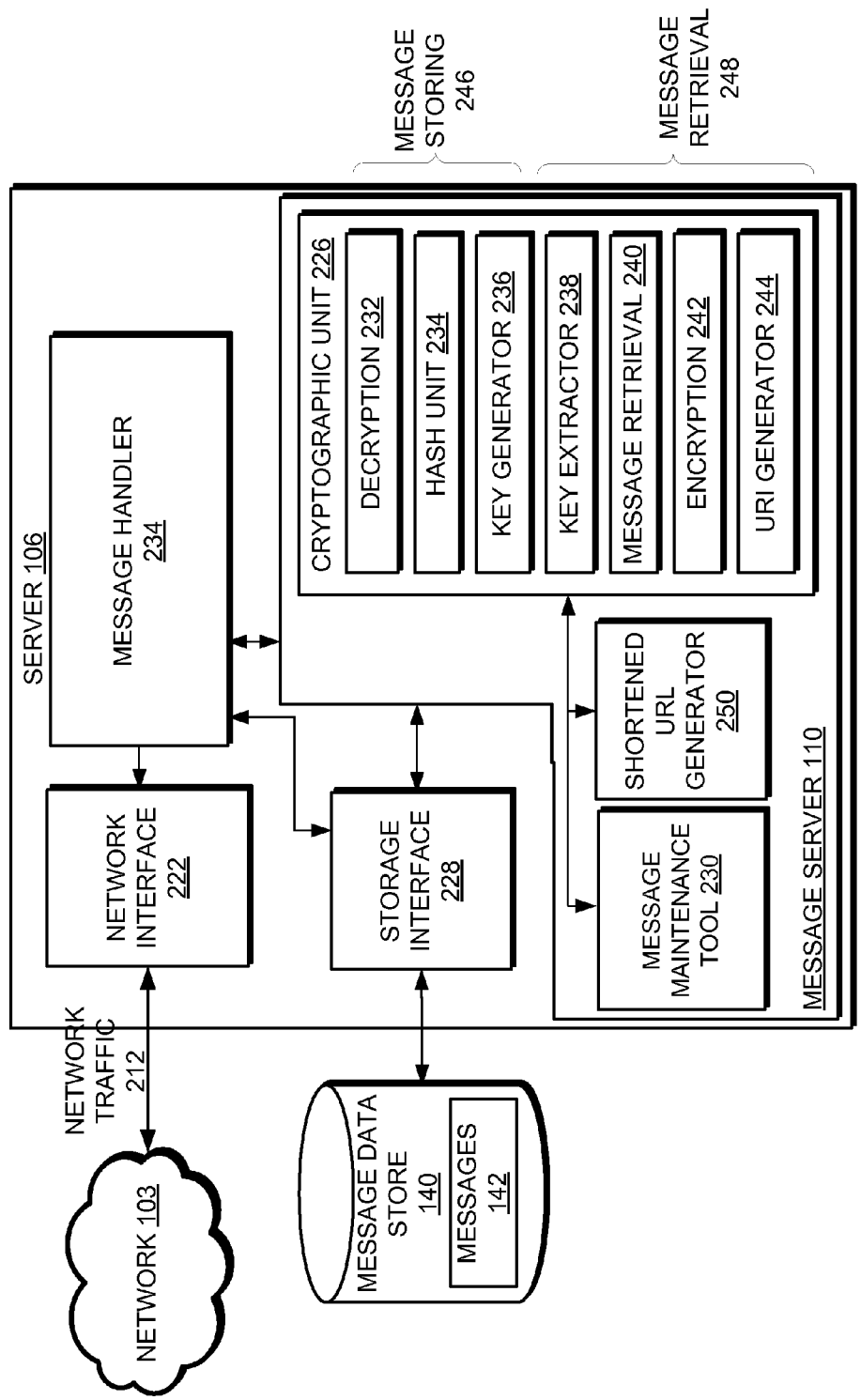
FIG. 2B is a block diagram of one embodiment of a server computing system including a cryptographic unit for encrypted URI based messaging.

FIG. 2B is a block diagram of one embodiment of a server computing system 106 including a cryptographic unit 226 for encrypted URI based messaging. In the depicted embodiment, the server computing system 106 includes a network interface 222, a message handler 234, and a storage interface 228, and hosts a message server 110. The server computing system 106 is coupled to the message data store 140 that stores the messages 142. The network interface 222 receives and sends network traffic 212. The network traffic 212 may include the encrypted messages sent from client computing systems 102, requests to retrieve the stored messages 142, and the responses to the requests, including the encrypted URI based messages. The server computing system 106 communicates with the message data store 140 via the storage interface 228. The message handler 234 monitors the network traffic 212 received at the network interface 222, and transfers the encrypted messages to the cryptographic unit 226 for message storage processing 246 and transfers the requests to the cryptographic unit 226 for message retrieval processing 248, described in more detail below.

For message storage processing 246, the cryptographic unit 226 receives the transferred messages from the message handler 234. The cryptographic unit 226 includes a decryption module 232 to decrypt the encrypted messages, a hashing unit 234 to hash the decrypted message for storage in the message data store 140, and a key generator 236 to generate unique keys for subsequent retrieval of the stored messages 142 from the message data store 140. The key generator 236 may generate a key for each message to be stored. The key may be a string of characters, and the string may be generated based on, for example, a name of the stored message, an identifier (e.g., randomly assigned identifier) for the stored message, or the like. The key is unique for every stored message that is stored in the message data store 140. In one embodiment, the key generator 236 sends the unique key to a shortened URL generator 250, which is configured to generate the shortened URLs for the stored messages 142. In this embodiment, the shortened URL includes at least a portion of the unique key. Alternatively, the shortened URL may be a string of characters, and the string may be generated based on, for example, a name of the stored message, an identifier (e.g., randomly assigned identifier) for the stored message, or the like. The shortened URL generator 250 sends the shortened URLs (with or without a portion of the unique key) to the sending client computing systems 102 over the network 103 via the network interfaces 222.

For message retrieval processing 248, the cryptographic unit 226 receives the transferred request from the message handler 234. The cryptographic unit 226 includes a key extractor 238 to extract the unique key from the shortened URL of the request, if the unique key is included in the shortened URL. The cryptographic unit 226 also includes a message retrieval unit 240 to retrieve the stored messages 142 from the message data store 140, using the unique key, for example. Once retrieved, an encryption module 242 of the cryptographic unit 226 encrypts the stored messages 142 into strings suitable for URL handling, and passes the strings to a URI generator 244 to generate URIs with an encryption type URI (e.g., "pgp://") and the encrypted string received from the encryption module 242.

In another embodiment, the message server 110 also includes a message maintenance tool 230. The message maintenance tool 230 is configured to perform maintenance and administrative tasks, such as enforcing policies on messages processed by the message server 110. For example, one policy may require messages to be stored for a limited time. In such a case, the message maintenance tool 230 may track metadata of the history of the stored messages 142, and take remedial action when necessary. The message maintenance tool 230 may also perform other operations pertaining to the message handler 234, shortened URL generator 250, and cryptographic unit 226, such as checking for software updates. The message maintenance tool 230 may provide a user interface to allow an administrator to configure the message server 110 and/or the message handler 234.

In another embodiment, the message server 110 is configured to encode the content of the received encrypted messages for network storage (e.g., Internet storage), including hashing the content, encrypting the content, compressing the content, and/or wrapping the content in ASCII armor. The message server 110 then uploads the content to the Internet storage site, such as, for example, Amazon Simple Storage Service (Amazon S3). Amazon S3 provides a web services interface that can be used to store and retrieve data, at any time, from anywhere on the web. Alternatively, other types of storage systems can be used to store the messages for encrypted URI based messaging. The message server 110 creates metadata describing the content, such as the exemplary metadata shown below.

<?xml version="1.0" encoding="UTF-8"?>
    <PGP>
    <DetachedData>
    <URI>http://s3.amazonaws.com/vmeng/foo.txt</URI>
    <FileName>Some Data.txt</FileName>
    <Type>text/plain</Type>
    <SessionKey           Algorithm="aes256-
       cbc">w6Vc6ZIoRQLrRpMYtxtiUn1b1VucOK+
       HpyxWUIhVrZo=</SessionKey>
    <Digest Algorithm="sha-512">QYkhdeGt5ClFHR1u8E
       HgAsqLhSrc9kiQrOYImLHXkhXCRwGDANbfeWeB
       FLRDnctGlLyLA+Vv8VXEa3kXn5/VLA==</Di-
       gest>
    <Compression Algorithm="bzip2"></Compression>
    <FYEO>true</FYEO>
    </DetachedData>
    </PGP>

The message server 100 can encode the metadata to an encryption packet (e.g., OpenPGP packet), and sends the packet to the recipient. The recipient receives the packet, decodes the metadata, and uses the metadata to retrieve the message stored at the network storage.

Figure 3:
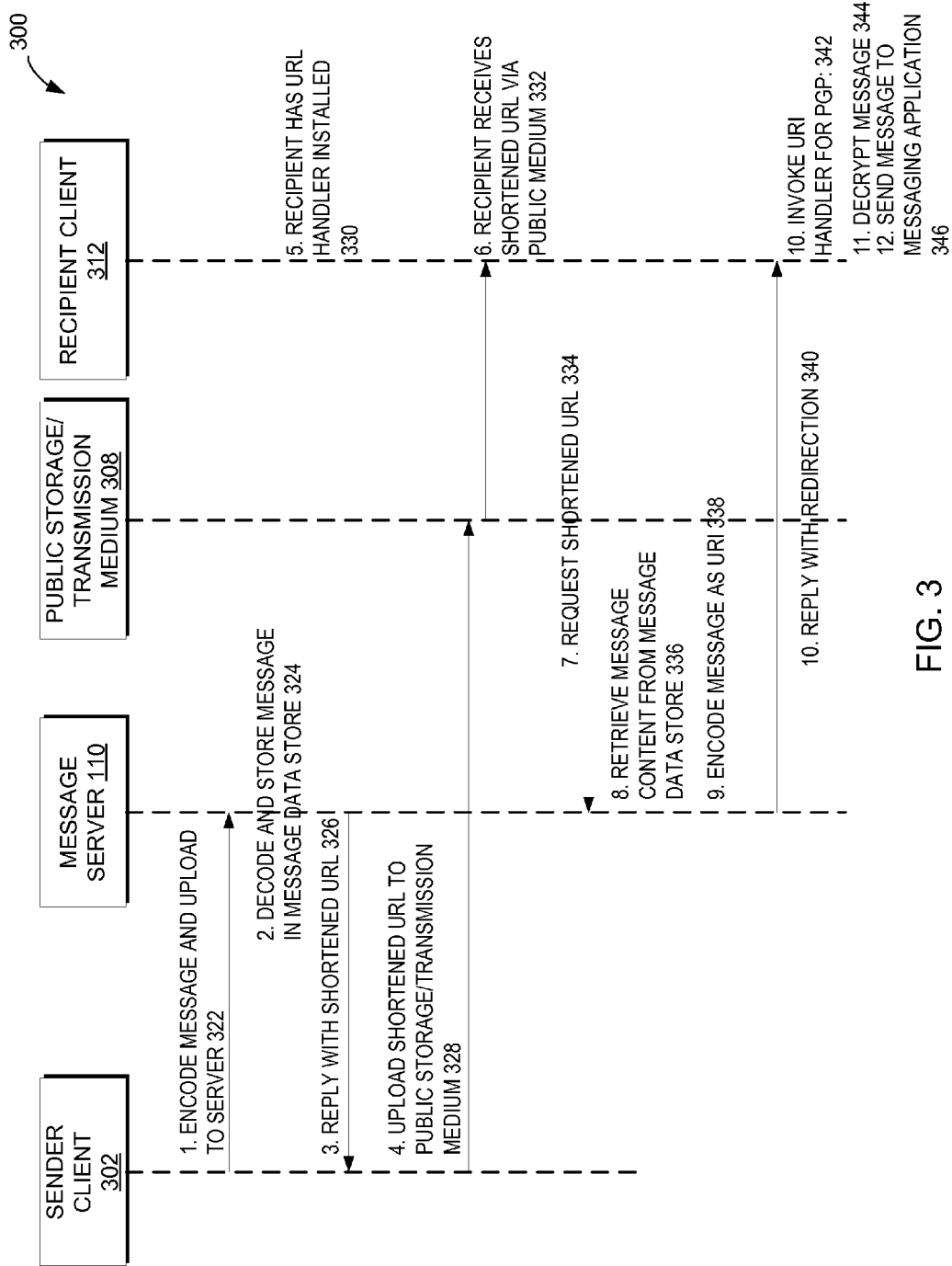
FIG. 3 illustrates one embodiment of a method for encrypted URI based messaging.

FIG. 3 illustrates one embodiment of a method for encrypted URI based messaging. Referring to FIG. 3, the sender client 302 encrypts message content using an encryption protocol, such as OpenPGP or S/MIME protocol, which results in an ASCII-armored message string (Radix-64 message string) and uploads it to the message server 110 at block 322. The message server 110 decodes the armor and retains the message in a message database at block 324. The message server 110 may hash the message and generate a database key, which can be used to later retrieve the message via a URL. At block 326, the message server 110 replies to sender client 302 with a shortened URL, for example, http://tinypgp.com/376jxsh4. Alternatively, other types of metadata may be used to point to the hosted content. At block 328, the sender client 302, communicates (e.g., transmits or posts) this shortened URL to a recipient client 312 via a public medium, such as, for example, via SMS, Twitter, or posts to a site such as Facebook. The recipient client 312 is capable of decrypting encoded URI based messages and presenting properly decoded messages. The recipient client may also register a handler with the operating system to process URLs encoded to a specific encryption type URI (e.g., "pgp://"). After receiving the shortened URL via the public medium at block 332 from the sender client, the recipient client requests the shortened URL at block 334, such as by following a link (typically by clicking) which causes the web browser and underlying operating to access the message server using an HTTP GET request. Upon receiving the request, the message server 110 retrieves the message content from the message data store at block 336. The message server 110 may extract the database key from the URL, and uses that to search for the original message in its data store. The message server 110 at block 338 encodes the original message as a URI. For example, the message server 110 may encode the original packet into a modified radix 64, which is suitable for URL handling, with the encryption type URI (e.g., URI "pgp://") prepended to the message string (e.g., "pgp://LS0tLS1CRUdJTiBQR1AgTUVTU0FHR . . . "). At block 340, the message server 110 replies to the web client request, for example, with an http redirection, using the encryption type URI (e.g., "pgp://"), generated at block 330. Upon receiving this reply at the web browser of the recipient client 312, the recipient client's operating system invokes the URL handler for the specified encryption type URI (e.g., "pgp://") at block 342. At block 344, the recipient client 312 decrypts the message, and passes the content of the message (e.g., contents of the redirection string) to the messaging application at block 346 for presenting the decrypted message. Alternatively, the URL handler can pass the content of the redirection string to the messaging application (e.g., email application), and the messaging application decodes the URI (e.g., modified Radix-64 message string), and attempts to decrypt and present the original message.

Figure 4A:
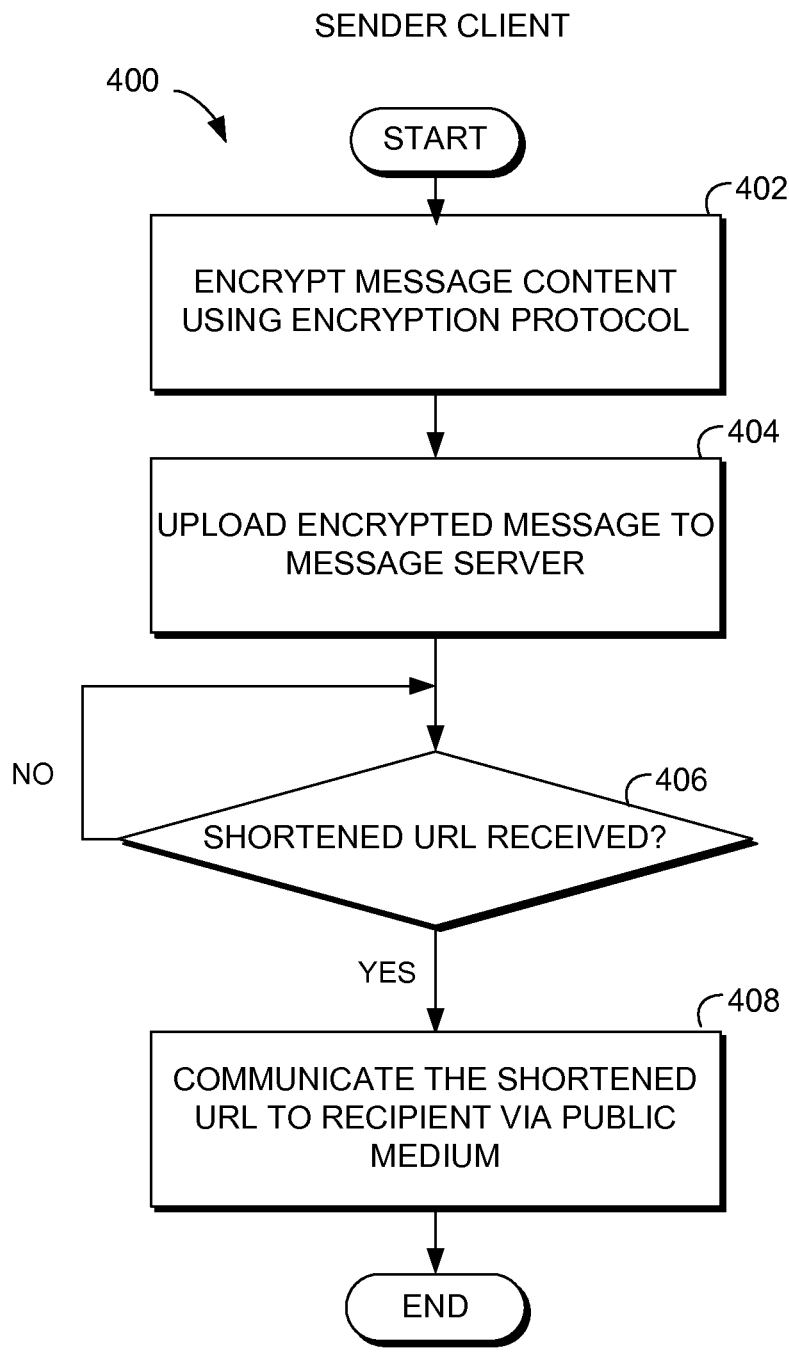
FIG. 4A is a flow diagram of one embodiment of a method of a sender client computing system for encrypted URI based messaging.

FIG. 4A is a flow diagram of one embodiment of a method 400 of a sender client computing system for encrypted URI based messaging. The method 400 is performed by processing logic that may comprise hardware (circuitry, dedicated logic, etc.), software (such as is run on a general purpose computing system or a dedicated machine), or a combination of both. In one embodiment, the client computing system 102 of FIGS. 1 and 2A performs the method 400.

Referring to FIG. 4A, processing logic begins by encrypting message content of a message (e.g., email message, IM message, text message, or the like) at block 402. The encrypted message may be a binary-to-text encoding, a Radix-64 message string, or the like. In some embodiments, the message is received from a messaging application (e.g., messaging application 208). In other embodiments, the method 400 is integrated into the messaging application itself. At block 404, processing logic uploads the encrypted message to a message server over a network. At block 406, processing logic determines if a shortened URL is received. If at block 406 the shortened URL is received, the method 400 proceeds to block 408; otherwise, the processing logic waits. At block 408, processing logic communicates the shortened URL to a recipient client computing system (described below in connection with FIG. 4C) via a public medium (e.g., public storage medium or public transmission medium), and the method 400 ends.

Figure 4B:
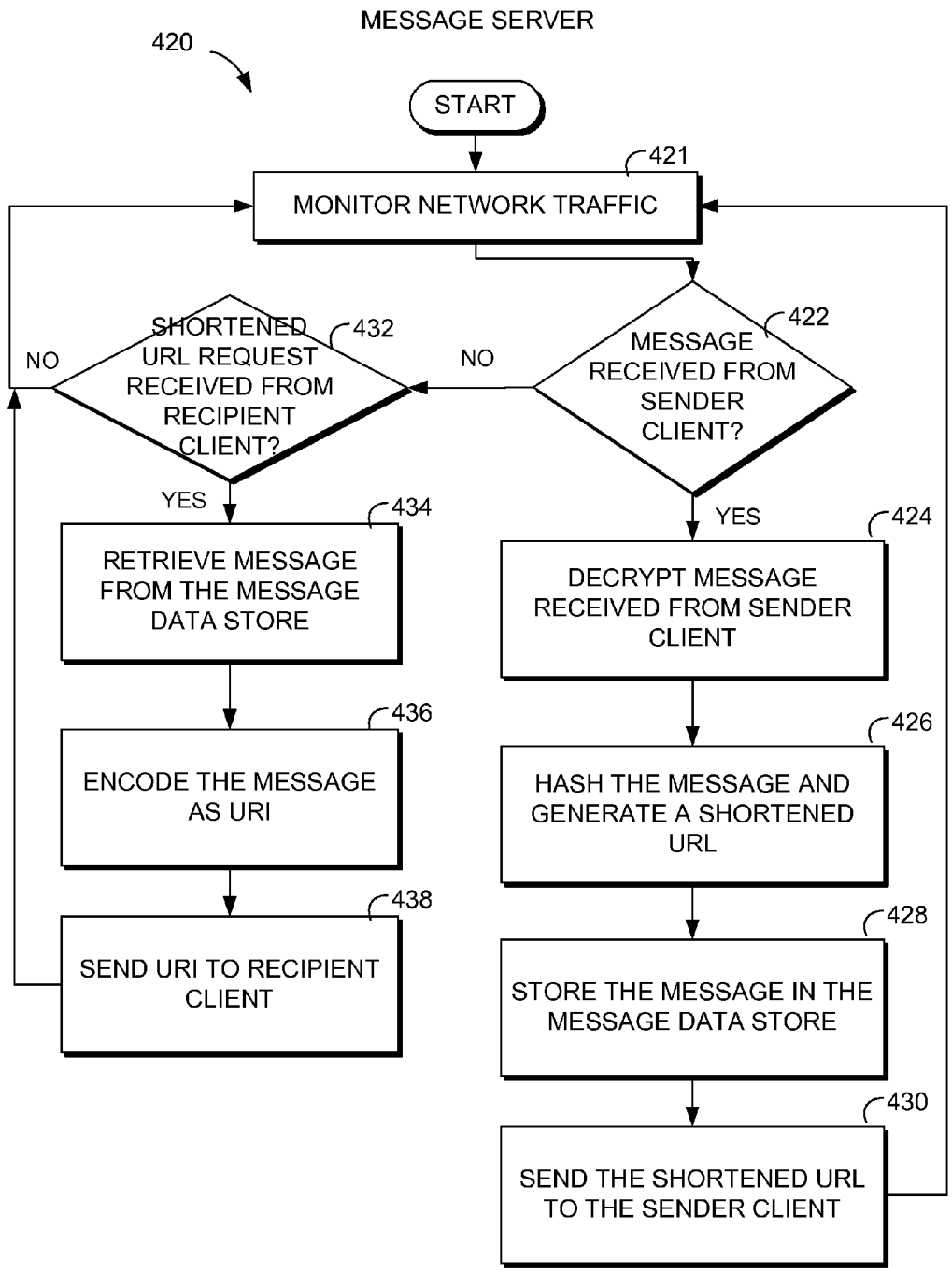
FIG. 4B is a flow diagram of one embodiment of a method of a server computing system for encrypted URI based messaging.

FIG. 4B is a flow diagram of one embodiment of a method 420 of a server computing system for encrypted URI based messaging. The method 420 is performed by processing logic that may comprise hardware (circuitry, dedicated logic, etc.), software (such as is run on a general purpose computing system or a dedicated machine), or a combination of both. In one embodiment, the message server 110 of FIGS. 1 and 2B performs the method 420.

Referring to FIG. 4B, processing logic begins by monitoring network traffic at block 421. At block 422, processing logic determines if a message is received from the sender client (described above in connection with FIG. 2A). If not, processing logic determines if a shortened URL request is received from a recipient client (described below in connection with FIG. 2C) at block 432. If no shortened URL request is received at block 432, processing logic returns to monitoring network traffic at block 431.

If, at block 422, a message is received from the sender client, processing logic decrypts the message received from the sender client at block 424. At block 426, processing logic hashes the decrypted message and generates a shortened URL for subsequent retrieval of the message. In one embodiment, the processing logic additionally generates a unique key for subsequent retrieval of the stored message. In some embodiments, the shortened URL, generated at block 426, may include at least a portion of the unique key. In addition, the unique key may identify an entry, such as an entry in a message database, storing the message. At block 428, processing logic stores the message in a message data store. In this embodiment, the processing logic hashes the message before storing the message in the message data store. In other embodiments, processing logic may not hash the decrypted message before being stored in the message data store. At block 430, processing logic sends the shortened URL to the sender client, and returns to monitoring network traffic at block 421.

If at block 432 a shortened URL request is received, processing logic retrieves the message from the message data store at block 434. In one embodiment, the request is a HTTP GET request. In this embodiment, the processing logic extracts the unique key from the shortened URL and retrieves the stored message using the unique key. At block 436, processing logic encrypts the message as a URI. At block 438, processing logic sends the URI to the recipient client, and returns to monitoring network traffic at block 421. In one embodiment, the processing logic encrypts the stored message at block 436 into a string suitable for URL handling, and prepends an encryption type URI (e.g., "pgp://") to the string. In another embodiment, the processing logic at block 438 sends the URI to the recipient client by replying to the HTTP GET request with an HTTP redirection string that includes the URI.

Figure 4C:
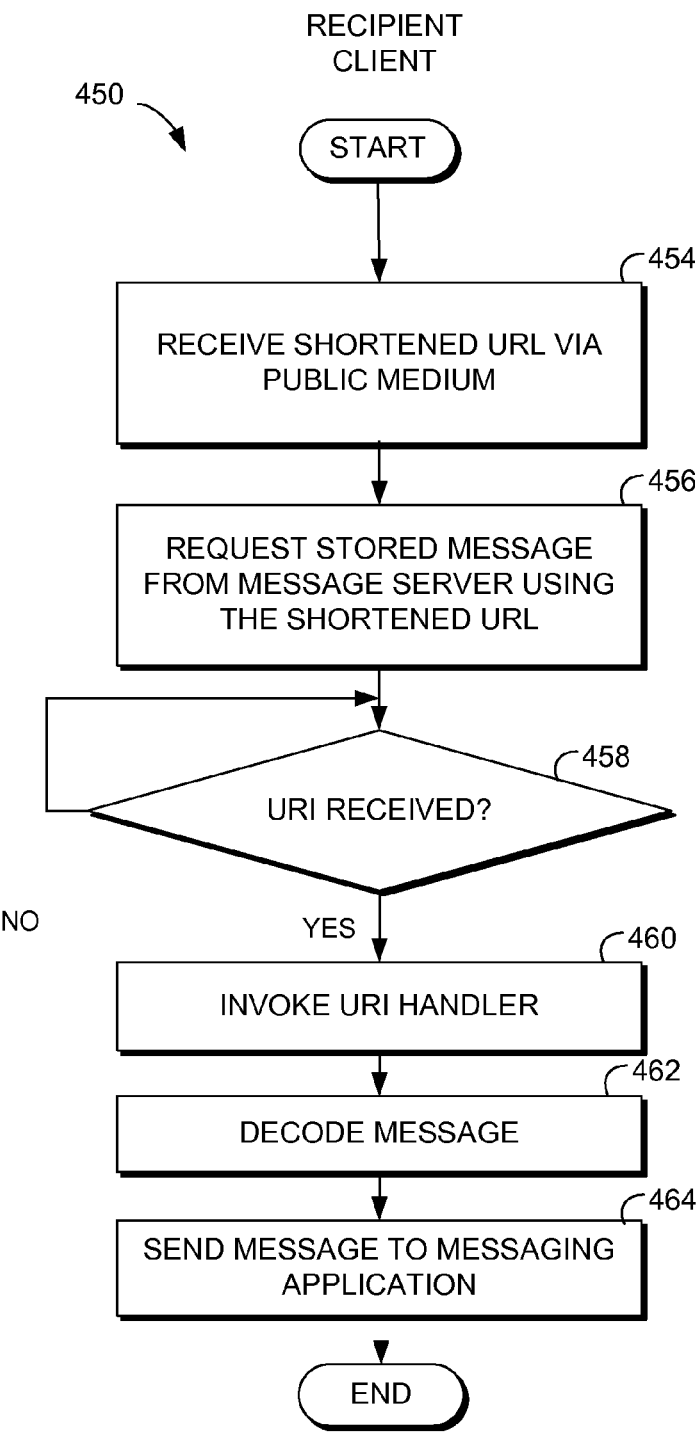
FIG. 4C is a flow diagram of one embodiment of a method of a recipient client computing system for encrypted URI based messaging.

FIG. 4C is a flow diagram of one embodiment of a method 450 of a recipient client computing system for encrypted URI based messaging. The method 450 is performed by processing logic that may comprise hardware (circuitry, dedicated logic, etc.), software (such as is run on a general purpose computing system or a dedicated machine), or a combination of both. In one embodiment, the client computing system 102 of FIGS. 1 and 2A performs the method 450.

Referring to FIG. 4C, processing logic begins by receiving a shortened URL via the public medium described in connection with block 408 of FIG. 4A. The processing logic may receive the shortened URL as user input via a user interface, or the shortened URL may be received over the network 103 and displayed to the user on a user interface, for example. At block 456, processing logic requests the stored message from the message server using the shortened URL 456, and waits to receive a URI, including the encrypted message, from the message server in response. At block 458, processing logic determines if the URI is received, and continues to wait until the URI is received. In one embodiment, at block 458, processing logic receives the URI as a HTTP redirection string, including the URI, from the message server. When the URI is received at block 458, processing logic invokes the previously installed URL handler at block 460. For example, the processing logic invokes a URL handler for the encryption type URI (e.g., "pgp://"). At block 462, processing logic decodes the encrypted message of the URI, and sends the decrypted message to a messaging application for presenting to a user at block 464. In some embodiments, the message is sent to a messaging application (e.g., messaging application 208). In other embodiments, the method 450 is integrated into the messaging application itself.

Figure 5:
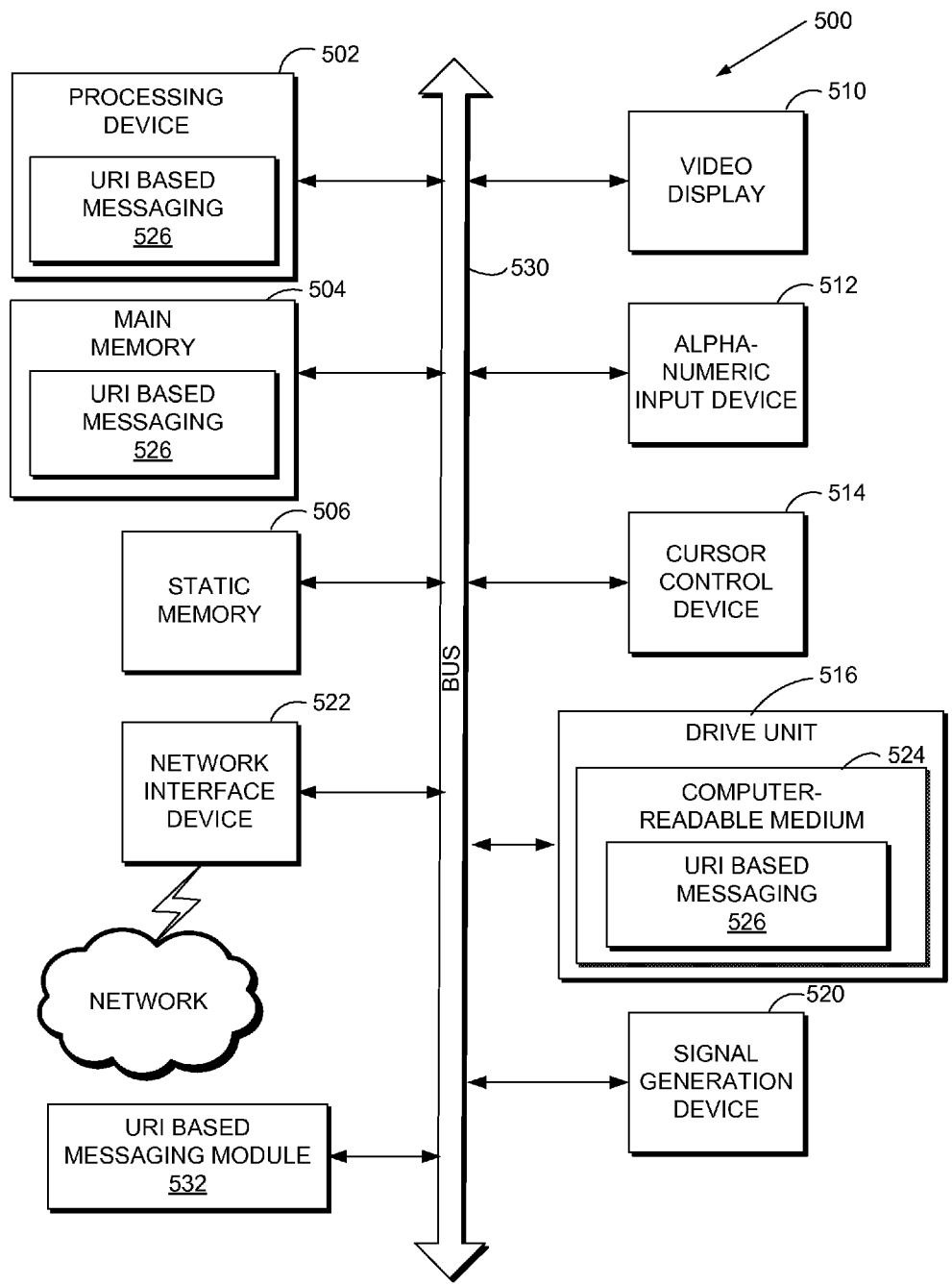
FIG. 5 illustrates a diagrammatic representation of a machine in the exemplary form of a computing system.

FIG. 5 illustrates a diagrammatic representation of a machine in the exemplary form of a computing system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 500 includes a processing device (processor) 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 518, which communicate with each other via a bus 506.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic for encrypted URI based messaging 526 for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions (e.g., encrypted URI based messaging 526) embodying any one or more of the methodologies or functions described herein. The encrypted URI based messaging 526 may also reside, completely or at least partially, within the main memory 504 and/or within the processor 502 during execution thereof by the computing system 500, the main memory 504 and the processor 502 also constituting computer-readable media. The encrypted URI based messaging 526 may further be transmitted or received over a network 520 via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The encrypted URI based messaging module 532, components, and other features described herein (for example in relation to FIGS. 1, 2A, and 2B) can be implemented as discrete hardware components or integrated in the functionality of hardware components such as ASICS, FPGAs, DSPs, or similar devices. The encrypted URI based messaging module 532 may implement operations of encrypted URI based messaging as described herein with respect to FIGS. 3-4C. In addition, the encrypted URI based messaging module 532 can be implemented as firmware or functional circuitry within hardware devices. Further, the encrypted URI based messaging module 532 can be implemented in any combination hardware devices and software components.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "generating", "sending", "encrypting," "hashing," "generating," or the like, refer to the actions and processes of a computing system, or similar electronic computing system that manipulates and transforms data represented as physical (e.g., electronic) quantities within the computing system's registers and memories into other data similarly represented as physical quantities within the computing system's memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. As discussed above, such a computer program may be stored in a computer readable medium.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, at a server computing system, an encrypted message from a first client computing system over a network;
storing the received message in a message data store;
generating a shortened uniform resource locator (URL) for subsequent retrieval of the stored message;
sending the shortened URL to the first client computing system;
receiving a request from a second client computing system to retrieve the stored message, the request comprising the shortened URL, wherein the receiving the request comprises receiving a Hypertext Transfer Protocol (HTTP) GET request;
extracting a unique key from the shortened URL;
retrieving the stored message using the unique key;
encrypting the stored message in a uniform resource identifier (URI), wherein the encrypting the stored message comprises:
encrypting the stored message into a string suitable for URL handling; and
prepending an encryption type URI to the string; and
sending the URI to the second client computing system, wherein the sending the URI comprises replying to the HTTP GET request with an HTTP redirection string comprising the URI.

2. The method of claim 1, further comprising:
decrypting the encrypted message received from the second client computing system;
hashing the decrypted message before storing the message in the message data store; and
generating the unique key for subsequent retrieval of the stored message.

3. The method of claim 2, wherein the message data store is a message database, and wherein the unique key uniquely identifies an entry in the message database that contains the message.

4. The method of claim 1, wherein the second client computing system receives the HTTP redirection string from the server computing system, invokes a URL handler for the encryption type URI, and passes contents of the HTTP redirection string to a messaging application.

5. The method of claim 1, wherein the encrypted message is a binary-to-text encoding.

6. The method of claim 1, wherein the encrypted message is a Radix-64 message string.

7. The method of claim 1, wherein the first client computing system communicates the shortened URL to the second client computing system using a public medium coupled to the network.

8. A non-transitory computer readable storage medium including instructions that, when executed by a server computing system, cause the server computing system to perform operations comprising:
receiving, at the server computing system, an encrypted message from a first client computing system over a network;
storing the received message in a message data store;
generating a shortened uniform resource locator (URL) for subsequent retrieval of the stored message;
sending the shortened URL to the first client computing system;
receiving a request from a second client computing system to retrieve the stored message, the request comprising the shortened URL, wherein the receiving the request comprises receiving a Hypertext Transfer Protocol (HTTP) GET request;
extracting a unique key from the shortened URL;
retrieving the stored message using the unique key;
encrypting the stored message in a uniform resource identifier (URI), wherein the encrypting the stored message comprises:
encrypting the stored message into a string suitable for URL handling; and
prepending an encryption type URI to the string; and
sending the URI to the second client computing system, wherein the sending the URI comprises replying to the HTTP GET request with an HTTP redirection string comprising the URI.

9. The computer readable storage medium of claim 8, wherein the operations further comprises:
decrypting the encrypted message received from the second client computing system;
hashing the decrypted message before storing the message in the message data store; and
generating the unique key for subsequent retrieval of the stored message, wherein the shortened URL comprises at least a portion of the unique key.

10. The computer readable storage medium of claim 8, wherein the second client computing system receives the HTTP redirection string from the server computing system, invokes a URL handler for the encryption type URI, and passes contents of the HTTP redirection string to a messaging application.

11. The computer readable storage medium of claim 8, wherein the encrypted message is a binary-to-text encoding.

12. The computer readable storage medium of claim 8, wherein the encrypted message is a Radix-64 message string.

13. The computer readable storage medium of claim 8, wherein the first client computing system communicates the shortened URL to the second client computing system using a public medium coupled to the network.

14. A system, comprising:
a message data store to store messages; and
a server computing system coupled to the message data store, wherein the server computing system is to operate a message server to receive an encrypted message from a first client computing system over a network, to store the received message in the message data store, to generate a shortened uniform resource locator (URL) for subsequent retrieval of the stored message, and to send the shortened URL to the first client computing system, and
wherein the message server is to receive a request from a second client computing system to retrieve the stored message, the request comprising the shortened URL, to encrypt the stored message in a uniform resource identifier (URI), and to send the URI to the second client computing system, wherein the server computing system comprises:
- a network interface to receive network traffic comprising at least one of the encrypted message and the request to retrieve the stored message;
- a storage interface coupled to communicate with the message data store;
- a message handler, the message handler to monitor the network traffic received on the network interface, and to transfer the encrypted message to a cryptographic unit for message storage processing and to transfer the request to the cryptographic unit for message retrieval processing;
- the cryptographic unit to perform message storage processing on the encrypted message and to perform message retrieval processing on the request; and
- a shortened URL generator to generate the shortened URL for subsequent retrieval of the stored message.

15. The system of claim 14, wherein the cryptographic unit comprises:
- a decryption module to decrypt the encrypted message;
- a hashing unit to hash the decrypted message for storage in the message data store;
- a key generator to generate a unique key for subsequent retrieval of the stored message, wherein the shortened URL comprises at least a portion of the unique key;
- a key extractor to extract the unique key from the shortened URL of the request;
- a message retrieval unit to retrieve the stored message using the unique key;
- an encryption module to encrypt the stored message into a string suitable for URL handling; and
- a URI generator to generate the URI with an encryption type URI and the encrypted string.

16. The system of claim 14, further comprising the first client computing system, wherein the first client computing system comprises:
- a messaging application to receive input to create the message;
- an encryption module to encrypted the message; and
- a network interface to send the encrypted message to the server computing system over the network and to receive the shortened URL from the server computing system over the network.

17. The system of claim 14, further comprising the second client computing system, wherein the second client computing system comprises:
- a network interface to send the request to the server computing system over the network and to receive the URI from the server computing system;
- a URL handler to pass the URI to a decryption module;
- a decryption module to receive the URI from the URL handler and to decrypt the encrypted contents of the URI and send the decrypted contents to a messaging application; and
- the messaging application to process the decrypted message.

* * * * *